United States Patent [19]

Tatsuno et al.

[11] Patent Number: 5,117,433
[45] Date of Patent: May 26, 1992

[54] SECOND HARMONIC GENERATOR FOR OBTAINING AN ABERRATION FREE PLANE WAVE AND INFORMATION PROCESSING SYSTEM USING THE SAME

[75] Inventors: Kimio Tatsuno, Kodaira; Hironori Yanagisawa, Kokubunji, both of Japan

[73] Assignee: Hitachi, Ltd., Tokyo, Japan

[21] Appl. No.: 618,406

[22] Filed: Nov. 27, 1990

[30] Foreign Application Priority Data

Nov. 27, 1989 [JP] Japan ............................ 1-304605
Dec. 20, 1989 [JP] Japan ............................ 1-328456

[51] Int. Cl.[5] .............................................. H01S 3/10
[52] U.S. Cl. ............................ 372/22; 385/130; 385/15; 385/33; 385/37; 372/66; 372/101; 359/428
[58] Field of Search .................. 307/425, 427, 428; 372/21, 22, 33, 66, 101, 102; 350/96.15, 96.12, 96.18, 432, 3.72; 346/108

[56] References Cited

U.S. PATENT DOCUMENTS

| | | | |
|---|---|---|---|
| 3,624,406 | 11/1971 | Martin | 307/427 |
| 4,682,336 | 7/1987 | Hendrix et al. | 371/10 |
| 4,824,220 | 4/1989 | Yamamoto et al. | 350/354 |
| 4,826,283 | 5/1989 | Chuangtian et al. | 350/96.12 |
| 4,852,961 | 8/1989 | Yamamoto et al. | 350/96.19 |
| 4,909,596 | 3/1990 | Okazaki et al. | 350/96.29 |
| 4,962,993 | 10/1990 | Okamoto et al. | 350/96.29 |
| 4,972,422 | 11/1990 | Tatsuno | 372/22 |

Primary Examiner—Georgia Epps
Attorney, Agent, or Firm—Antonelli, Terry, Stout & Kraus

[57] ABSTRACT

A second harmonic generator of the present invention utilizes Cerenkov radiation as a useful coherent short-wavelength light source. The second harmonic generator includes an aberration correction means to collimate the second harmonic to form a parallel plane wave having a high flatness. The aberration correction means is provided on an exit end face of a nonlinear waveguide which generates the second harmonic, and a glued cone prism, a cone prism having a conic exit end face changed in accordance with birefringence of the nonlinear waveguide, or a diffraction grating is used as the aberration correction means.

22 Claims, 5 Drawing Sheets

SECOND HARMONIC GENERATOR FOR OBTAINING AN ABERRATION FREE PLANE WAVE AND INFORMATION PROCESSING SYSTEM USING THE SAME

BACKGROUND OF THE INVENTION

The present invention relates to a second harmonic generator which utilizes Cerenkov radiation useful as a source of coherent short-wave light.

Such a second harmonic generator is useful as a light source for recording and/or reproducing in optical information processing systems such as optical disks, laser printers or color printers.

There has heretofore been known technology for generating second harmonics of Cerenkov radiation by forming organic materials having nonlinear characteristics into a device of fiber form and inputting coherent fundamental light thereinto, as described, for example, in Nonlinear Optical Materials-Extended Abstract, 1985, pp. 97-99.

The Cerenkov radiation is composed of second harmonics radiated by a polarization wave having a phase velocity greater than the phase velocity of a medium. However, since the beam shape of the Cerenkov radiation has a cone or an arc shape, it cannot be focused into a good spot.

Furthermore, the generation of second harmonics by Cerenkov radiation from waveguides fabricated on the surface of a substrate of nonlinear crystals such as lithium niobate ($LiNbO_3$) has been reported in CLEO '87, Technical Digest, pp. 198-199. This method has many advantages in that the secondary light having a wavelength one-half that of the fundamental light can be generated with a high conversion efficiency. In addition, the phase matching of the two light waves having different wavelengths can be achieved relatively easily.

Figure 8:
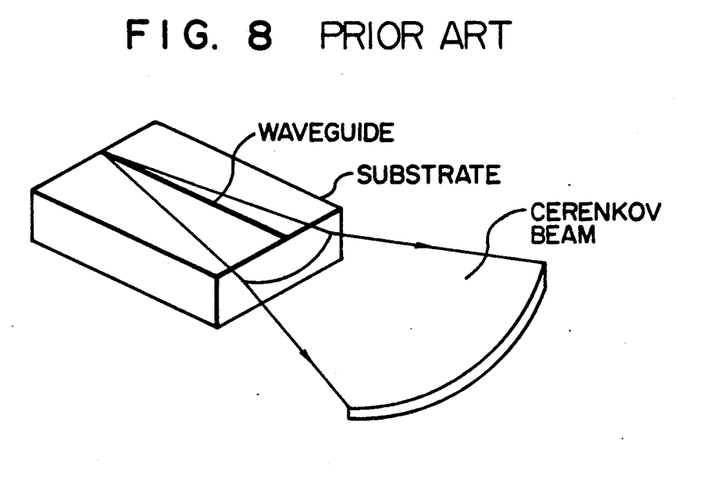
FIG. 8 is a perspective view of a prior art second harmonic generator.

With this method, however, as shown in FIG. 8, since a radiation mode is established from a narrow line-shaped waveguide into the substrate, the light diverges in the direction of radiation while the light is collimated in parallel in the direction at right angles thereto. Therefore, the light cannot be focused to a good spot. Specifically, in the prior art shown in FIG. 8, the substrate of the waveguides consists simply of a block having a flat surface without being devised in particular. Thus, the Cerenkov beam which has passed through the substrate develops a large aberration, and it cannot be focused into a good spot unless a correction measure is employed.

As described above, in the prior art technologies, the countermeasure for the aberration of the Cerenkov beam is insufficient, and thus, it is impossible to focus the Cerenkov beam into a diffraction limited spot. As a result, the Cerenkov beam cannot be used as a light beam for recording and/or reproducing in optical information processing system such as optical disks and the like.

SUMMARY OF THE INVENTION

It is a first object of the present invention to provide a second harmonic generator which is capable of collimating a second harmonic such as the Cerenkov beam to a flat parallel plane wave.

It is a second object of the present invention to provide a second harmonic generator which is capable of converting a second harmonic such as the Cerenkov beam to an aberration free plane wave without being influenced by a variation in wavelength of incident light (fundamental light) thereby making it possible to focus the beam a diffraction limited spot.

It is a third object of the present invention to provide a compact second harmonic generator which is capable of generating a coherent second harmonic which is collimated to a high flatness without being influenced by birefringence of a nonlinear crystal.

It is a fourth object of the present invention to provide a second harmonic generator which is capable of generating a second harmonic of an aberration free plane wave which can be focused into a diffraction limited spot stably regardless of fluctuations of temperature and mechanical fluctuations.

It is a fifth object of the present invention to provide an information precessing system capable of recording and/or reproducing information with high recording density by using the second harmonic generator as mentioned above as a source of coherent short-wavelength light.

In one feature of the present invention, a nonlinear waveguide means including a waveguide of a fiber form or a channel type formed of materials having nonlinear optics effects comprises an aberration correction means which collimates a second harmonic to a flat parallel plane wave. The nonlinear waveguide means is composed of a fiber form or a channel type waveguide (a core layer of a fiber, or a channel layer which is formed by diffusing Ti in a surface of a nonlinear optical crystal and the Ti-diffused layer is subjected to proton exchange to enhance a refractive index), and a holding member (a cladding layer of the fiber, or the nonlinear optical crystal such as $LiNbO_3$) for retaining the waveguide. When the waveguide having nonlinear optical characteristics is irradiated by coherent light, a Cerenkov beam is radiated from the waveguide towards the holding member in a cone shape, and the Cerenkov beam is output from the exit end face of the holding member. The holding member has the aberration correction means provided on the exit end face.

A technique devised to convert the wavefront of the cone shape due to the Cerenkov radiation into a parallel plane wave by means of a conic prism is n U.S. Ser. No. 408,537 filed Sept. 18, 1989, now U.S. Pat. No. 4,972,422. By using this conic prism, it is possible to convert the Cerenkov beam into a parallel plane wave. However, the direction of travel of the Cerenkov beam is varied sensitively with respect to a change in wavelength of the fundamental light due to a temperature change or the like, and as a result, chromatic aberration is caused. Therefore, a diffraction limited spot cannot be obtained stably.

On the other hand, in channel waveguides having a substrate formed of a nonlinear crystal (for example, a uniaxial crystal or a biaxial crystal) such as lithium niobate or the like having optical anisotropy, another problem arises in which an aberration of a wavefront is caused due to birefringence or double refraction of the nonlinear crystal.

In another feature of the present invention, as the aberration correction means provided on the exit and face of the nonlinear waveguide means, a conic prism of a glued type formed by bonding two or more materials having different refractive indices is used. Specifically, with respect to a variation of a Cerenkov radiation angle caused by a wavelength change of the fundamental light due to fluctuations of temperature, a so-called achromatic cone lens formed by the conic prism of the glued type is used as a chromatic aberration correction means, thereby to convert a variation of an angle of incidence at which the Cerenkov beam enters the conic prism into a parallel displacement of the Cerenkov beams while maintaining parallel beams.

The Cerenkov angle $\alpha$ is given by the following formula in accordance with the phase matching condition.

$$\alpha = \cos^{-1}\left(\frac{N(\omega)}{n(2\omega)}\right)$$

Here, $n(2\omega)$ is the refractive index with respect to the second harmonic (Cerenkov beam), and $N(\omega)$ is the refractive index with respect to the fundamental wave. The refractive index $N(\omega)$ can be considered as an effective refractive index of the nonlinear waveguide means. In the case of the fiber form waveguide, the effective refractive index is determined by respective refractive indices of the core layer and the cladding layer, and in the case of the channel type waveguide, the effective refractive index is determined by respective refractive indices of the proton-exchanged waveguide and the nonlinear crystal substrate. Because these effective refractive indices are changed sensitively following a wavelength change of the fundamental wave, the Cerenkov angle $\alpha$ is also varied sensitively according thereto.

When a parallel plane wave is to be obtained by focusing such a Cerenkov radiation beam by using the conic prism, if the Cerenkov angle is changed by a variation of wavelength of the fundamental wave, the angle of incidence of the Cerenkov radiation beam entering the conic prism is varied and the parallel plane wave cannot be obtained.

Accordingly, a conic prism formed of two or more materials having different refractive indices is used, and the variation of incident angle with respect to the conic prism is converted into a translation or a parallel displacement while maintaining parallel beams. As a result, even when the radiation angle of Cerenkov radiation emitted from the nonlinear waveguide is varied due to fluctuations in ambient temperature, after the Cerenkov radiation beam is focused by the conic prism of the glued type, the parallel plane wave is maintained and a beam shift is merely caused. Thus, it is possible to obtain an aberration free plane wave without being affected by wavelength fluctuations of the incident light (fundamental wave), and to ensure the precision of a spot of a diffraction limit by focusing the plane wave through a lens.

In another feature of the present invention, as the aberration correction means, the shape of the exit end face of the nonlinear waveguide means is changed in accordance with birefringent characteristics of the nonlinear waveguide means. Specifically, when the birefringence is present in the nonlinear waveguide means, in particular, in the case of the channel type waveguide having a substrate formed of a nonlinear optical crystal, the refractive index $n(2\omega)$ is changed depending on an angle $\phi$ between an optical axis and a Cerenkov beam. Thus, the Cerenkov angle $\alpha$ is changed depending on the angle $\phi$ in accordance with the following phase matching condition, that is, $$\cos\alpha = \frac{N(\omega)}{n(2\omega)}$$

which must be satisfied at the time of Cerenkov radiation. In other words, the Cerenkov angle $\alpha$ is given by the following formula;

$$\alpha(\phi) = \cos^{-1}\left(\frac{N(\omega)}{n(2\omega, \phi)}\right).$$

For this reason, when a mere conic prism is used as the aberration correction means which is provided on the exit end face of the nonlinear waveguide means, it is impossible to make all Cerenkov radiation beams into a parallel plane wave. Hence, the vertex angle $\theta$ of the conic prism is modulated in accordance with the angle $\alpha$ between the optical axis and the Cerenkov beam to satisfy the following relationship, $$\theta(\phi) = \frac{\pi}{2} - \tan^{-1}\left[\sin\alpha(\phi) / \left(\cos\alpha(\phi) - \frac{1}{n(\phi)}\right)\right]$$

so that the shape of the conic exit end face of the conic prism is changed. In this manner, any Cerenkov beam radiated from the nonlinear waveguide can be converted into the parallel plane wave. Therefore, the aberration free plane wave can be obtained without being affected by birefringent characteristics of the nonlinear waveguide, and the coherent second harmonic which is collimated to a high flatness can be obtained.

In still another feature of the present invention, as the aberration correction means, a conic prism of the glued type formed by bonding two or more materials having different refractive indices is employed, and furthermore, the shape of a conic exit end face of the glued type conic prism is changed in accordance with birefringent characteristics of the nonlinear waveguide means. Specifically, by combining the above-mentioned correction of chromatic aberration with the correction of wave front aberration due to birefringence, even when the nonlinear waveguide means having the birefringence is used, an aberration free plane wave can be obtained without being affected by wavelength fluctuations of the fundamental wave and by the birefringent characteristics of the nonlinear waveguide means. As a result, it is possible to always obtain a stable flat parallel plane wave, and thus, to focus the flat parallel plane wave into a spot of a diffraction limit.

In another feature of the present invention, as the aberration correction means, a diffraction grating is provided on the exit end face of the non-linear waveguide means. More specifically, a conic Cerenkov beam emitted from a fiber form or a channel type nonlinear optical medium is converted into a parallel plane wave by diffracting by the diffraction grating formed in the exit end face of the nonlinear guide wave in which grooves of the diffraction grating are concentric circles centered at a core of the fiber or a channel waveguide.

In still another feature of the present invention, the exit end face of the nonlinear waveguide has a spherical surface, and the diffraction grating is formed in the spherical surface. Specifically, in the course of manufacturing of the diffraction grating, the occurrence of a manufacturing error is unavoidable, and it is difficult to make the center of the diffraction grating of concentric circle form perfectly coincide with the position of the fiber form or channel type waveguide. For this reason, the sine condition which is a characteristic to be possessed by a microscope objective lens, that is, the condition for removing a coma aberration is introduced. In other words, an exit end face of a fiber cladding, or an exit end face of a waveguide substrate which is the exit end face of the nonlinear waveguide means is formed in a spherical surface, and the concentric circle shaped diffraction grating is formed in the spherical surface, and the center of the spherical surface is made in coincidence with the center of the fiber form or channel type waveguide. As a result, even when a deviation is present more or less between the center of the diffraction grating and the position of the fiber form or channel type waveguide, the aberration never becomes large, and it is possible to collimate to a plane wave having a high flatness, and subsequently to focus into a spot of a diffraction limit through a lens.

Furthermore, the diffraction grating can be used also for correcting the above-mentioned chromatic aberration and for correcting the wave front aberration due to birefringence. For example, in correcting the chromatic aberration, a plurality of diffraction gratings are used, and the plurality of diffraction gratings may be disposed so that the fluctuations of Cerenkov radiation angle caused by wavelength fluctuations of the fundamental wave are converted into a translation or parallel displacement while maintaining parallel beams. Further, in correcting the wavefront aberration due to birefringence, the groove intervals of the diffraction grating may be changed in accordance with the birefringence characteristics of the nonlinear waveguide means.

Still further advantages of the present invention will become apparent to those of ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred and alternate embodiments of the invention only, and not for the purpose of limiting the same and wherein:

FIGS 1A and 1B are diagrams illustrating an embodiment of the present invention, in which

DESCRIPTION OF THE PREFERRED EMBODIMENTS

An embodiment of the present invention will be described with reference to FIGS. 1A and 1B. In this embodiment, a semiconductor laser 1 is used as a light source of fundamental light, and a fiber form waveguide 3 is used as a nonlinear waveguide means. The light, for example, having a single wavelength in a range between 600 nm and 1.5 $\mu$m, from the semiconductor laser 1 is focused through a lens 2, and introduced into a fiber form waveguide (core) 31 formed of a nonlinear optical material, thereby to generate a second harmonic (a wavelength of 300 to 750 nm) 4 of Cerenkov radiation type with a radiation angle $\alpha$. The fiber form waveguide (core) 31 retained in a cladding 33, and the Cerenkov beam 4 from the core layer 31 is radiated within the cladding 33. A parallel plane wave 5 is obtained from the Cerenkov beam 4 by a conic prism 35 provided on an exit end face of the cladding 33, and a spot 7 is produced by focusing the parallel plane wave 5 through a focusing lens 6.

However, when an oscillation wavelength of the semiconductor laser 1 which is the light source is changed due to fluctuations of ambient temperature or the like, the Cerenkov radiation angle $\alpha$ is changed, for example, to a radiation angle $\alpha'$. The ray of light radiated at the angle $\alpha'$ cannot any longer become the parallel plane wave by the conic prism of the same shape, and the ray of light becomes a diverging or a converging beam and involves an aberration.

Figure 1A:
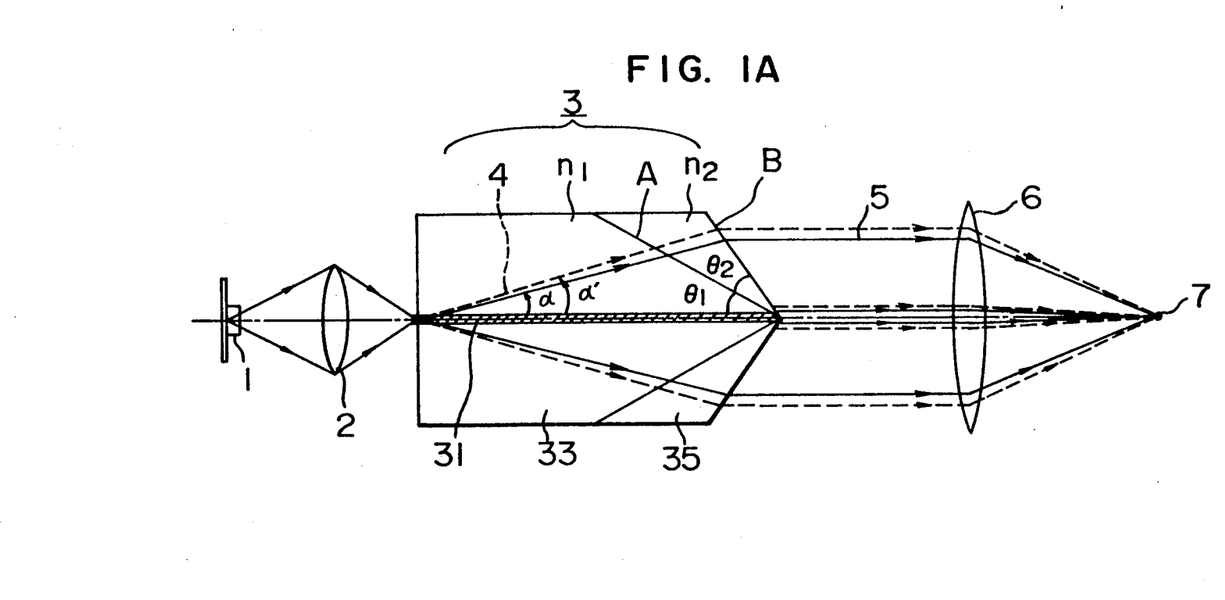
FIG. 1A is a sectional view of a second harmonic generator using a fiber form waveguide and a focusing optical system.
Figure 1B:
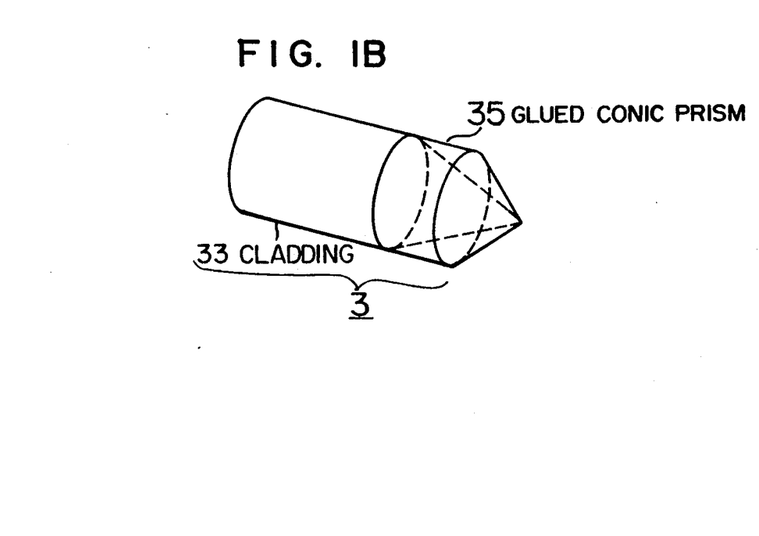
FIG. 1B is a perspective view of a nonlinear waveguide means including a glued conic prism.

For this reason, in the present invention, as shown in FIGS. 1A and 1B, the conic prism 35 is formed by bonding materials having different refractive indices n1 and n2 to form a glued conic prism. For example, prism elements having angles $\theta_1$ and $\theta_2$ are bonded to each other. Such a glued conic prism 35 may be formed by integrally forming one prism element integral with the cladding 33 as a unitary member as shown in FIG. 1A, or the glued prism 35 may be bonded to the cladding 33 as shown in FIG. 1B.

Two rays of light Cerenkov-radiated in different directions with the radiation angles $\alpha$ and $\alpha'$ pass through a refracting surface A (a bonding surface of the glued conic prism) and a refracting surface B (the exit surface of the glued conic prism). Thus, either of the two rays of light can be converted into the parallel plane wave 5 by suitably selecting the refractive indices n1 and n2, and the angles $\theta_1$ and $\theta_2$ of individual prism elements constituting the glued conic prism 35.

Accordingly, even when the Cerenkov radiation angle is changed by fluctuations of the wavelength of the semiconductor laser 1 due to a change in ambient temperature, the parallel plane wave can be obtained without being affected by the change in the Cerenkov radiation angle, and the parallel plane wave involving no aberration can be obtained. As a result, it becomes possible to obtain the focused spot 7 of a diffraction limit by focusing the parallel plane wave through a focusing optical system such as the lens 6 or the like.

Figure 2:
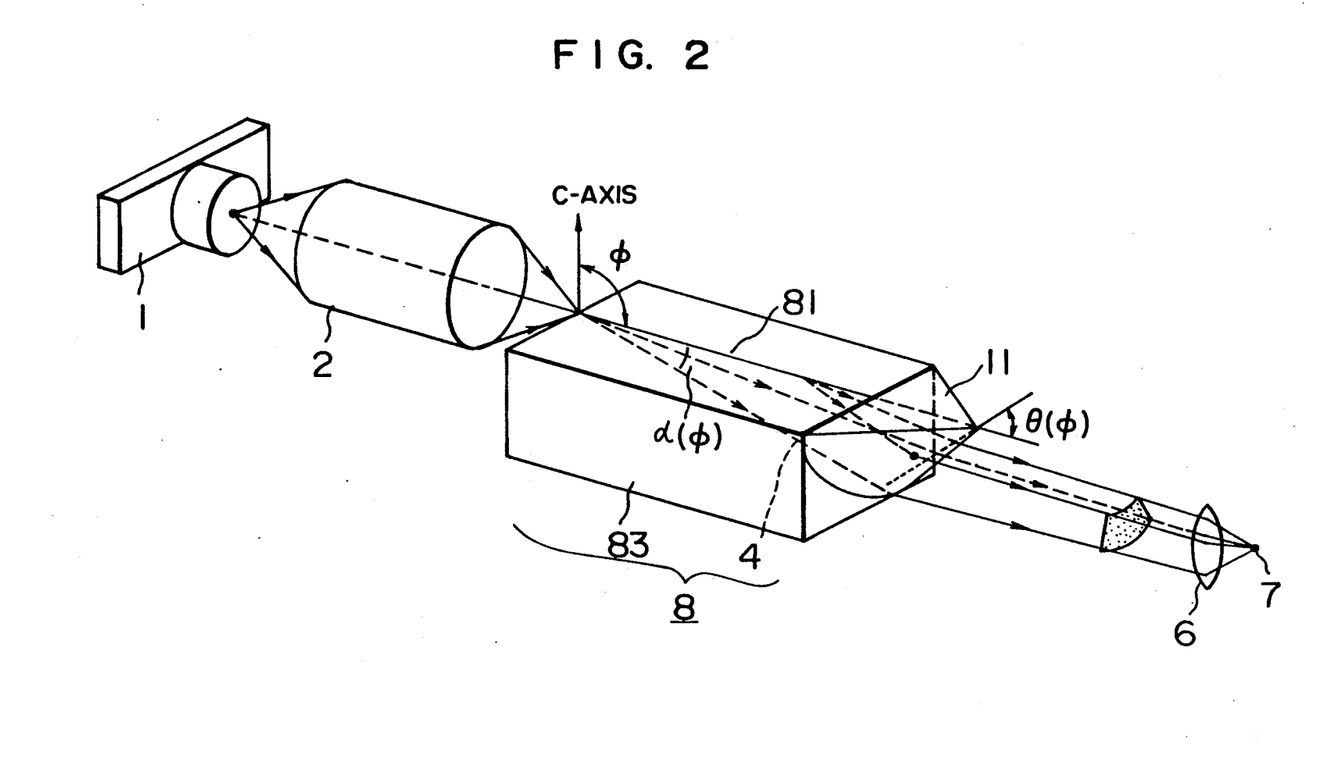
FIG. 2 is a diagram illustrating a second embodiment of the present invention in which a second harmonic generator using a channel type waveguide and a focusing optical system are shown.

FIG. 2 shows a second embodiment of the present invention. In this embodiment, a channel type waveguide 8 is used as the nonlinear waveguide means. Similar to the first embodiment, the beam from a semiconductor laser 1 which is a light source for fundamental light is focused through a lens 2 and is introduced into an optical waveguide 81 of the channel type waveguide 8, thereby to radiate a Cerenkov beam 4 towards a substrate 83 at an angle $\alpha(\phi)$. In this case, for example, when a nonlinear optical crystal of lithium niobate ($LiNbO_3$) is used as the substrate 83 of the channel type waveguide 8, since a maximum nonlinear constant $d_{33}$ is used, its optical axis (C-axis) is directed in a perpendicular direction with respect to the optical waveguide 81 as shown in FIG. 2.

Accordingly, each Cerenkov angle $\alpha(\phi)$ is associated with a different refractive index $n_e(\phi)$ depending upon the angle $\phi$ with respect to the C-axis. This means that, when the direction of polarization of the semiconductor laser 1 is selected to be in parallel to the C-axis, the direction of polarization of the second harmonic will be perpendicular to the C-axis, and a so-called extraordinary ray will be emitted. The refractive index $n_e(\phi)$ of the extraordinary ray has a different value depending on the angle $\phi$.

For this reason, in this embodiment, the shape of a conic exit surface of a conic prism 11 provided on an exit end face of the channel type waveguide 8 is modulated, for example, a vertex angle $\theta(\phi)$ of the conic prism 11 is slightly changed in accordance with the angle $\phi$ so that the vertex angle $\phi(\theta)$ satisfies the following relationship, $$\theta(\phi) = \frac{\pi}{2} - \tan^{-1}\left[\sin\alpha(\phi) / \left(\cos\alpha(\phi) - \frac{1}{n_e(\phi)}\right)\right]$$

In this manner, the Cerenkov beam after passing through the conic prism 11 becomes a parallel plane wave without being affected by the birefringence characteristics of the channel type waveguide 8, and the aberration free parallel wave can be obtained. Accordingly, it becomes possible to always obtain a focused spot 7 by focusing the parallel plane wave through a focusing optical system such as a lens 6 or the like.

The conic prism 11 as described above may be a unitary type in which the conic prism 11 integrally is formed with the substrate 83 of the channel type waveguide 8, or a separate type in which the conic prism 11 is a separate member from the substrate 83. However, when taking position matching into consideration, the separate type is advantageous.

Furthermore, also in the second embodiment, when the conic prism 11 is constituted by the glued conic prism shown in the first embodiment of FIGS. 1A and 1B, the correction of chromatic aberration is combined with the correction for birefringence, and the aberration free parallel plane wave can be obtained without being affected by the fluctuations of the Cerenkov radiation angle due to the wavelength fluctuations of the fundamental light and the birefringent characteristics of the nonlinear waveguide means.

Figure 3:
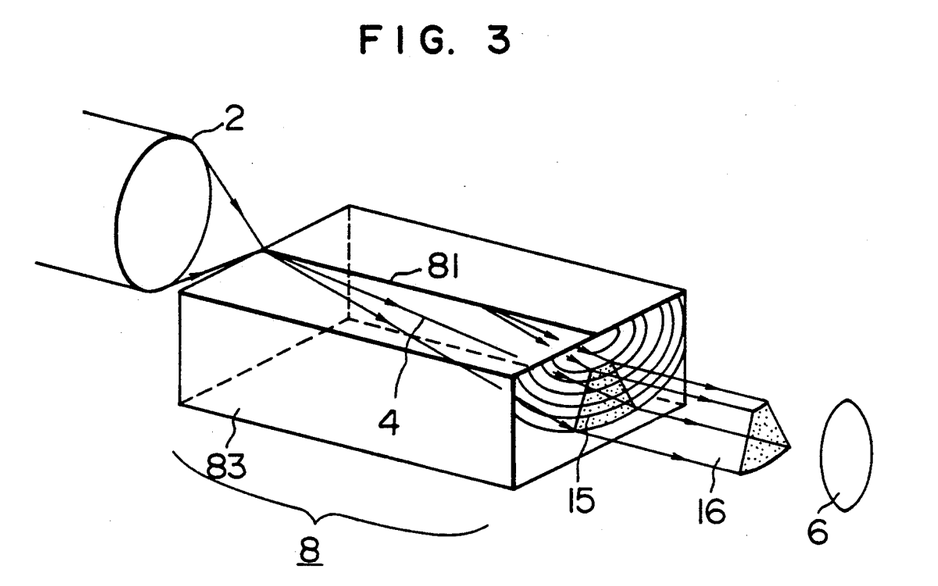
FIG. 3 is a diagram illustrating a third embodiment o the present invention, which is a schematic perspective view of a second harmonic generator using a diffraction grating as an aberration correction means.

FIG. 3 shows a third embodiment of the present invention. In this embodiment, a channel type waveguide 8 is used as the nonlinear waveguide means, and a diffraction grating 15 is used as the aberration correction means. Similar to the embodiments described above, a light beam from an exciting light source (not shown) such as a semiconductor laser or the like is focused through a lens 2, and the focused light beam enters a waveguide 81 for generating a second harmonic having nonlinear optical characteristics, thereby to radiate a second harmonic 4 of the Cerenkov type towards a substrate 83 as a cone shaped beam.

The Cerenkov radiation beam 4 is collimated by the diffraction grating 15 carved or ruled in an exit end face of the substrate 83, and travels as a parallel plane wave 16. The diffraction grating 15 consists of a group of grooves of concentric circles centered at the waveguide 81. Such a diffraction grating, can be formed, for example, by mechanically ruling lines using a ruling engine, an etching process using an electron beam, or the like. Since the beams collimated by the diffraction grating 15 have a flat wavefront, similar to the embodiments described in the foregoing, the beams are focused into a spot of a diffraction limit by a focusing optical system such as a lens 6 or the like.

Figure 4:
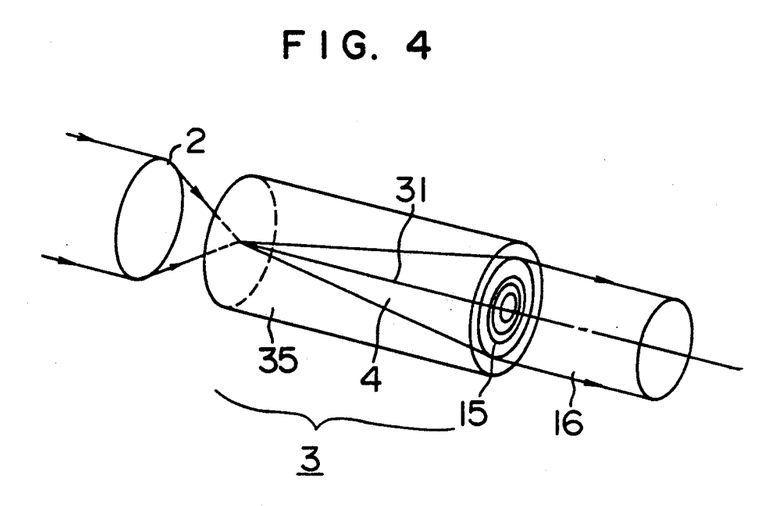
FIG. 4 is a diagram showing a variant example of the embodiment of FIG. 3, which is a schematic perspective view of a second harmonic generator using a fiber form waveguide.

FIG. 4 illustrates a variant example of the third embodiment, and a fiber form waveguide 3 is used as the nonlinear waveguide. Specifically, similar to the first embodiment in FIGS. 1A and 1B, the fundamental light is directed to enter a nonlinear optical waveguide 31 of fiber form to generate a Cerenkov beam 4. In an exit end face of the fiber form waveguide 3, similar to the third embodiment, there is formed a diffraction grating 15 of a concentric circle shape centered at the waveguide (core) 31, and the Cerenkov beam 4 having a cone shape is diffracted by the diffraction grating 15 to become a parallel plane wave 16.

Figure 5:
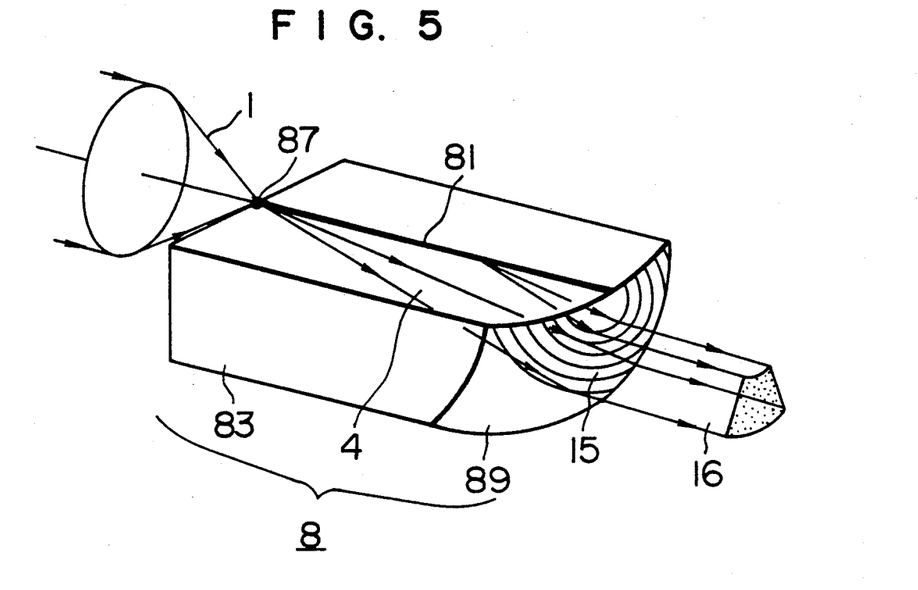
FIG. 5 is a diagram illustrating a fourth embodiment of the present invention, which is a schematic perspective view of a second harmonic generator using a spherical surface diffraction grating as an aberration correction means.

FIG. 5 illustrates a fourth embodiment of the present invention. In this embodiment, similar to the third embodiment in FIG. 3, a channel type waveguide 8 is used as the nonlinear waveguide, and a diffraction grating 15 is used as the aberration correction means. In this case, however, an exit end face 89 of the channel type waveguide 8 is formed into a spherical surface centered with respect to an incident end face 87 of a waveguide 81 in advance, and the diffraction grating 15 is formed in the exit end face 89. In this manner, even when the center of the diffraction grating 15 and the position of the waveguide 81 are deviated, or inclined more or less relative to each other, beams 16 which have been collimated can be made a parallel plane wave maintaining a high flatness.

Figure 6:
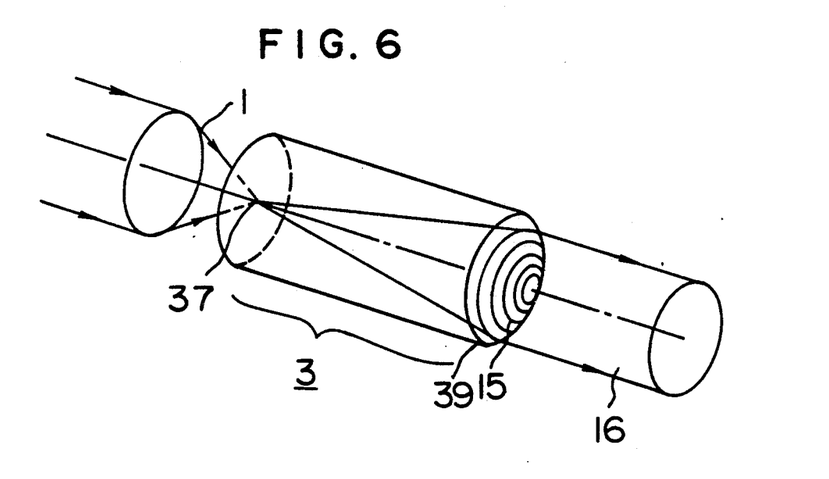
FIG. 6 illustrating a variant example of the fourth embodiment of FIG. 4, which is a schematic perspective view of a second harmonic generator using a fiber form waveguide.

FIG. 6 illustrates a variant example of the fourth embodiment, and a fiber form waveguide 3 is used as the nonlinear waveguide means. Specifically, similar to the embodiment in FIG. 4, an exit end face 39 of the fiber form waveguide 3 is formed into a spherical surface centered with respect to an end face 37 of a waveguide (core) 31. As a result of this, the sine condition is satisfied, and even when the center of the fiber form waveguide 3 and the center of concentric circle grooves of a diffraction grating 15 are deviated, or inclined relative to each other, it is possible to obtain a parallel plane wave 16 having a high flatness.

Furthermore, the diffraction grating 15 described in the embodiments in FIGS. 3 to 6 can be used for correcting the chromatic aberration and for correcting the wavefront aberration due to birefringence described in the embodiment in FIGS. 1A and 1B or FIG. 2. For example, in correcting the chromatic aberration, two or more diffraction gratings are employed, and the plurality of diffraction gratings may be disposed so that with respect to the fluctuations of Cerenkov radiation angle caused by wavelength fluctuations of the fundamental wave, the Cerenkov beams are converted into a parallel displacement while maintaining parallel beams.

In addition, in order to correct the wavefront aberration, the groove intervals of the diffraction grating may be changed in accordance with the birefringent characteristics of the nonlinear waveguide means.

Further, when the second harmonic (wavelength λ) formed in a flat parallel wave by the second harmonic generator described in the embodiments and the variant examples in FIGS. 1A and 1B and 2 to 6 is focused by an objective lens having a relatively large numerical aperture (NA), it is possible to obtain a spot which is determined by a so-called λ/NA. Accordingly, a short-wavelength light source suitable for information processing systems such as optical disks, laser printers, and the like can be obtained.

Figure 7:
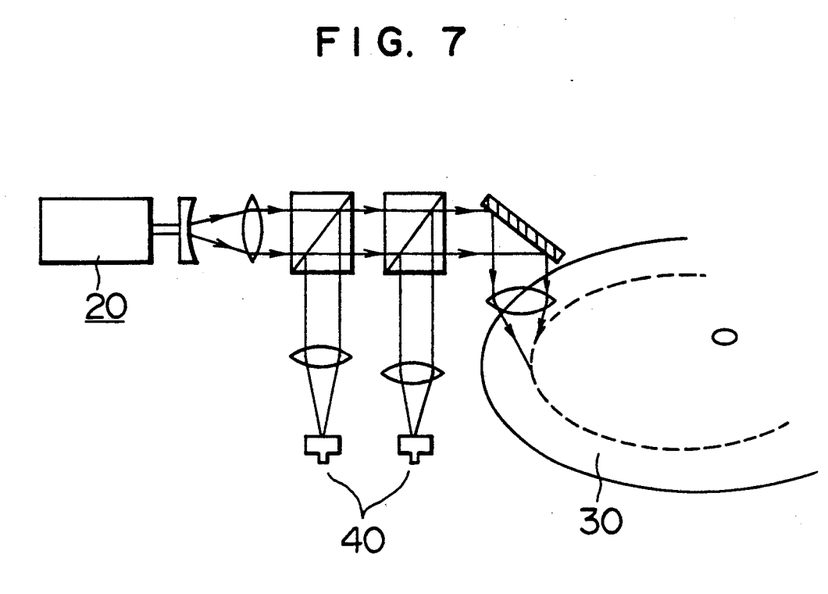
FIG. 7 is a diagram illustrating an embodiment of the present invention in which the second harmonic generator of the present invention is used as a light source of an optical disk device.

FIG. 7 illustrates an embodiment of the information processing system. The parallel plane wave from a short-wavelength light source 20 constituted by the second harmonic generator (the arrangement with the exception of the objective lens 6) described in the embodiments and their variant examples in FIGS. 1A and 1B and 2 to 6 is permitted to pass through a focusing optical system composed of various lenses, beam splitter and a mirror, and is focused into a diffraction limited spot to irradiate an optical disk 30. The reflected light or diffracted light from pits recorded in the surface of the disk 30 is received by photodetectors 40, and an auto-focusing signal, a tracking signal, a data signal, and the like are detected.

The invention has been described with reference to the preferred and alternate embodiments. Obviously, modifications and alternations will occur to those of ordinary skill in the art upon reading and understanding the present invention. It is intended that the invention be construed as including all such modifications and alternations in so far they come with the scope of the appended claims or the equivalent thereof.

We claim:

1. A second harmonic generator comprising:
nonlinear waveguide means for guiding light, said nonlinear waveguide means including a waveguide having nonlinear optical characteristics;
means for directing fundamental light to enter said waveguide; and
aberration correction means provided on an exit end face of said nonlinear waveguide means for collimating a second harmonic to form a substantially flat parallel plane wave, said second harmonic being radiated as a result of said fundamental light being incident on said waveguide;
wherein said aberration correction means includes chromatic aberration correction means for converting a change in a radiation angle of said second harmonic due to a wavelength fluctuation of said fundamental light into a parallel displacement of said substantially flat parallel plane wave.

2. A second harmonic generator according to claim 1 wherein said chromatic aberration correction means is comprised of a conic prism of glued type formed by bonding two or more materials having different refractive indices to each other.

3. A second harmonic generator according to claim 1 wherien said aberration correction means further includes birefringent aberration correction means for correcting a change in an optical path length of said second harmonic due to birefringent characteristics of said nonlinear waveguide means.

4. A second harmonic generator according to claim 1 wherein said aberration correction means is comprised of a conic prism of glued type formed by bonding two or more materials having different refractive indices to each other, and a shape of a conic exit end face of said glued type conic prism is a function of birefringent characteristics of said nonlinear waveguide means.

5. A second harmonic generator according to claim 3 wherein said birefringent aberration correction means is comprised of a conic prism having a conic exit end face having a shape which is a function of birefringent characteristics of said nonlinear waveguide means.

6. A second harmonic generator according to claim 1 wherein said aberration correction means is comprised of a diffraction grating formed in the exit end face of said nonlinear waveguide means.

7. A second harmonic generator according to claim 6 wherein said diffraction grating includes a group of grooves of concentric circles centered at said waveguide.

8. A second harmonic generator according to claim 6 wherein the exit end face of said nonlinear waveguide means has a spherical surface, and said diffraction grating is formed in said spherical surface.

9. A second harmonic generator comprising:
nonlinear waveguide means for guiding light, said nonlinear waveguide means including a waveguide having nonlinear optical characteristics;
means for directing fundamental light to enter said waveguide; and
aberration correction means provided on an exit end face of said nonlinear waveguide means for collimating a second harmonic to form a substantially flat parallel plane wave regardless of a change in a radiation angle of said second harmonic, thereby to obtain a substantially aberration-free plane wave, said second harmonic being radiated as a result of said fundamental light being incident on said waveguide.

10. A second harmonic generator according to claim 9 wherien said aberration correction means is comprised of a conic prism formed by bonding two or more materials having different refractive indices to each other for converting a change in the radiation angle of said second harmonic into a parallel displacement of said substantially aberration-free plane wave.

11. A second harmonic generator according to claim 9 wherein said aberration correction means includes an achromatic cone lens formed by bonding two or more materials having different refractive indices to each other.

12. A second harmonic generator according to claim 9 wherein said aberration correction means further includes birefringent aberration correction means for correcting a change in an optical path length of said second harmonic due to birefringent characteristics of said nonlinear waveguide means.

13. A second harmonic generator according to claim 12 wherien said aberration correction means includes a conic prism of glued type formed by bonding two or more materials having different refractive indices to each other, and a shape of a conic exit end face of said glued type conic prism is a function of birefringent characteristics of said nonlinear waveguide means.

14. A second harmonic generator comprising:

nonlinear waveguide means for guiding light, said nonlinear waveguide means including a nonlinear crystal having birefringent characteristics and a waveguide formed on the nonlinear crystal and having nonlinear optical characteristics;

means for directing fundamental light to enter said waveguide; and aberration correction means provided on an exit end face of said nonlinear waveguide means for collimating a second harmonic radiated from said waveguide as a result of said fundamental light being incident on said waveguide to form a substantially flat parallel plane wave regardless of the birefringent characteristics of said nonlinear crystal, thereby to obtain a substantially aberration-free plane wave.

15. A second harmonic generator according to claim 14 wherien said aberration correction means is comprised of a conic prism having a conic exit end face having a shape which is a function of the birefringent characteristics of said nonlinear crystal.

16. A second harmonic generator according to claim 14 wherein said nonlinear crystal includes one of a uniaxial crystal and a biaxial crystal said uniaxial crystal and said biaxial crystal having optical anisotropy.

17. An information processing system comprising:
nonlinear waveguide means for guiding light, said nonlinear waveguide means including a waveguide having nonlinear optical characteristics;

means for directing fundamental light to enter said waveguide;

aberration correction means provided on an exit end face of said nonlinear waveguide means for collimating a second harmonic radiated from said waveguide as a result of said fundamental light being incident on said waveguide to form a substantially flat parallel plane wave; and an optical system for focusing said substantially flat parallel plane wave into a diffraction limited spot on an information recording surface;

wherein said aberration correction means is comprised of a conic prism formed by bonding two or more materials having different refractive indices to each other for converting a change in a radiation angle of said second harmonic due to a wavelength fluctuation of said fundamental light into a parallel displacement of said substantially flat parallel plane wave.

18. An information processing system according to claim 17 wherein said aberration correction means further includes birefringent aberration correction means for correcting a change in an optical path length of said second harmonic due to birefringent characteristics of said nonlinear waveguide means.

19. An information processing system according to claim 17 wherein said conic prism has a conic exit end face having a shape which is a function of birefringent characteristics of said nonlinear waveguide means.

20. An information processing system comprising:
nonlinear waveguide means for guiding light, said nonlinear waveguide means including a waveguide having nonlinear optical characteristics;

means for directing fundamental light to enter said waveguide;

aberration correction means provided on an exit and face of said nonlinear waveguide means for collimating a second harmonic radiated from said waveguide as a result of said fundamental light being incident on said waveguide to form a substantially flat parallel plane wave; and an optical system for focusing said substantially flat parallel plane wave into a diffraction limited spot on an information recording surface;

wherein said aberration correction means is comprised of a diffraction grating formed in the exit end face of said nonlinear waveguide means.

21. An information processing system according to claim 20 wherein the exit end face of said nonlinear waveguide means has a spherical surface, and said diffraction grating is formed in said spherical surface.

22. A second harmonic generator according to claim 15 wherien said conic prism has a vertex angle $\theta$ which is a function of an angle $\phi$ between an optical axis of said nonlinear waveguide means and a direction along a radiation angle $\alpha$ of said second harmonic as shown in the following relationship:

$$\theta(\phi) = \frac{\pi}{2} - \tan^{-1}\left[\sin\alpha(\phi) / \left(\cos\alpha(\phi) - \frac{1}{n(\phi)}\right)\right].$$

* * * * *